US 8,429,025 B2

(12) United States Patent
Fries (10) Patent No.: US 8,429,025 B2
(45) Date of Patent: Apr. 23, 2013

(54) METHOD, MEDIUM, AND SYSTEM OF ASCERTAINING GARMENT SIZE OF A PARTICULAR GARMENT TYPE FOR A CONSUMER

(76) Inventor: Amanda Fries, Ellicott City, MD (US)

( * ) Notice: Subject to any disclaimer, the term of this patent is extended or adjusted under 35 U.S.C. 154(b) by 0 days.

(21) Appl. No.: 13/050,391

(22) Filed: Mar. 17, 2011

(65) Prior Publication Data
US 2011/0231278 A1 Sep. 22, 2011

Related U.S. Application Data (60) Provisional application No. 61/314,790, filed on Mar. 17, 2010.

(51) Int. Cl.
G06Q 30/00 (2006.01)
(52) U.S. Cl.
USPC ..................................... 705/26.63
(58) Field of Classification Search ................. 705/26.1, 705/27.1, 26.63, 26.7
See application file for complete search history.

(56) References Cited

U.S. PATENT DOCUMENTS

| 5,680,314 | A | 10/1997 | Patterson et al. |
| 5,930,769 | A | 7/1999 | Rose |
| 6,311,403 | B1 | 11/2001 | Macrini |
| 6,546,309 | B1 | 4/2003 | Gazzuolo |
| 6,665,577 | B2 | 12/2003 | Onyshkevych et al. |
| 6,701,207 | B1 | 3/2004 | Gazzuolo |
| 7,092,782 | B2 | 8/2006 | Lee |
| 7,398,133 | B2 | 7/2008 | Wannier et al. |
| 8,095,426 | B2 * | 1/2012 | Adelman et al. ............. 705/26.1 |
| 2006/0059054 | A1 * | 3/2006 | Adiseshan ...................... 705/26 |
| 2009/0182612 | A1 * | 7/2009 | Challener et al. .............. 705/10 |
| 2009/0234489 | A1 * | 9/2009 | Healy .......................... 700/130 |
| 2010/0023421 | A1 * | 1/2010 | Wannier et al. ................ 705/26 |
| 2010/0030578 | A1 * | 2/2010 | Siddique et al. ................. 705/3 |
| 2012/0022978 | A1 * | 1/2012 | Manea et al. ................. 705/27.2 |

OTHER PUBLICATIONS

Jan. 9, 2010—http://web.archive.org/web/20100109014508/http://www.sizewand.com/.*
Apr. 11, 2001—http://web.archive.org/web/20010411103540/http://www.ezsize.com/.*
MyTrue Fit SM and True FitSM Data Services (www.mytruefit.com); last visited Jun. 20, 2011.
Getmysize.com ; last visited Jun. 20, 2011.

(Continued)

Primary Examiner — Jeffrey A Smith
Assistant Examiner — Matthew Zimmerman
(74) Attorney, Agent, or Firm — Ober, Kaler, Grimes & Shriver; Royal W. Craig; Christopher F. Lonegro (57) ABSTRACT

The present invention is a garment sizing system that that identifies the correct garment size for a particular garment type for a plurality of brands. In an embodiment, the garment sizing system is a client-server system that uses at least one server to host a website, garment sizing software, and at least one database. The consumers access the website over a communication network using networked devices. The database is populated with garment data such as garment type, brand name, brand line, retailers that sell that sell the brand, garment size, and dimensional garment measurements. Using the website, the consumer inputs the consumer's body measurement or the size of a specific garment that is known to fit the consumer, and the system retrieves and displays from the database the correct sizes for a specific garment type from a variety of brands based on the inputted data.

15 Claims, 11 Drawing Sheets

OTHER PUBLICATIONS

Clothes Size iPhone application by Sayware (http://Sayware.com); last visited Jun. 20, 2011.

My Virtual Model (http://corpo.mvm.com); last visited Jun. 20, 2011.

MyShapeTM (www.myshape.com); last visited Jun. 20, 2011.

Size WandSM (www.sizewand.com); last visited Jun. 20, 2011.

* cited by examiner

METHOD, MEDIUM, AND SYSTEM OF ASCERTAINING GARMENT SIZE OF A PARTICULAR GARMENT TYPE FOR A CONSUMER

CROSS-REFERENCE TO RELATED APPLICATIONS

The present application derives priority from U.S. provisional application Ser. No. 61/314,790 filed 17 Mar. 2010.

BACKGROUND OF THE INVENTION

1. Field of the Invention

The present invention relates to clothing and, particularly, to a garment sizing system that identifies the correct garment sizes for a given garment type from a plurality of brands.

2. Description of the Background

In 1983, the U.S. Department of Commerce quit using a uniform sizing system for women's clothing garments because the system no longer reflected the size and shape of the average consumer. Since that time, garment sizing has been left up to manufacturers that have continually redefined the previous sizing standards or instead have created their own standards. Thus, garment sizes now vary widely between designers or brands and even between garment lines of the same brand. Larger retailers establish sizing profiles and order to specification from the brand manufacturers. For example, NORDSTROM® offers a selection of clothing, shoes, cosmetics, and accessories for women, men and children, and they use ORACLE's Retail Size Profile Optimization software to improve assortment productivity and ensure better alignment of the right merchandise in the right sizes to meet customer demand by both category and store. This results in unique store size profiles for NORDSTROM's clothing merchandise. Other retailers have different sizing profiles. Consequently, a store size 1 in TARGET® stores may be a size 2 in OLD NAVY®, a size 3 in NORDSTROM®, and so on. Sizing within stores may run bigger or smaller, and some stores run even-numbered sizes (2, 4, 6, etc.) while others use odd-number sizing (1, 3, 5, etc.). And still other stores use Euro/UK sizing (25, 26, 27, etc.). This variation in sizing standards presents a substantial conundrum for the average consumer, which is amplified by online shopping when the consumer cannot try on the garment before purchasing. What is needed is a solution for correlating the "true size" or actual size of a desired garment from consumer-input size and/or garment information with reference to a database of store sizes, and for displaying the most appropriate store size of available garment brands and merchants stocking said brands to facilitate purchase of a desired garment in the consumer's right size.

SUMMARY OF THE INVENTION

It is, therefore, an object of the present invention to provide a method of consolidating, processing and transforming data in a distributed computer apparatus to provide a website point of entry for a consumer to identify the correct size of a desired garment type for a plurality of brands.

It is another object to implement the above-described system as a client-sever system over a communication network in which a application service provider maintains the system.

In accordance with the foregoing objects, the present invention is a garment sizing system that identifies the correct garment size for a particular garment type (for example, pants, blouse, etc.) from a plurality of brands. In an embodiment, the garment sizing system is a client-server system maintained by a manager or ASP that uses at least one server to host a website, garment sizing software, and at least one database. The consumers access the website over a communication network using networked computers or mobile communication devices. The database is populated with garment data such as garment type, brand name, brand line, retailers that sell the brand, garment size, and dimensional garment measurements. Using the website, the consumer inputs the consumer's body measurements or the size of a specific garment that is known to fit the consumer, and the system retrieves from the database the correct size for a specific garment type from a variety of brands based on the inputted data.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Figure 1:
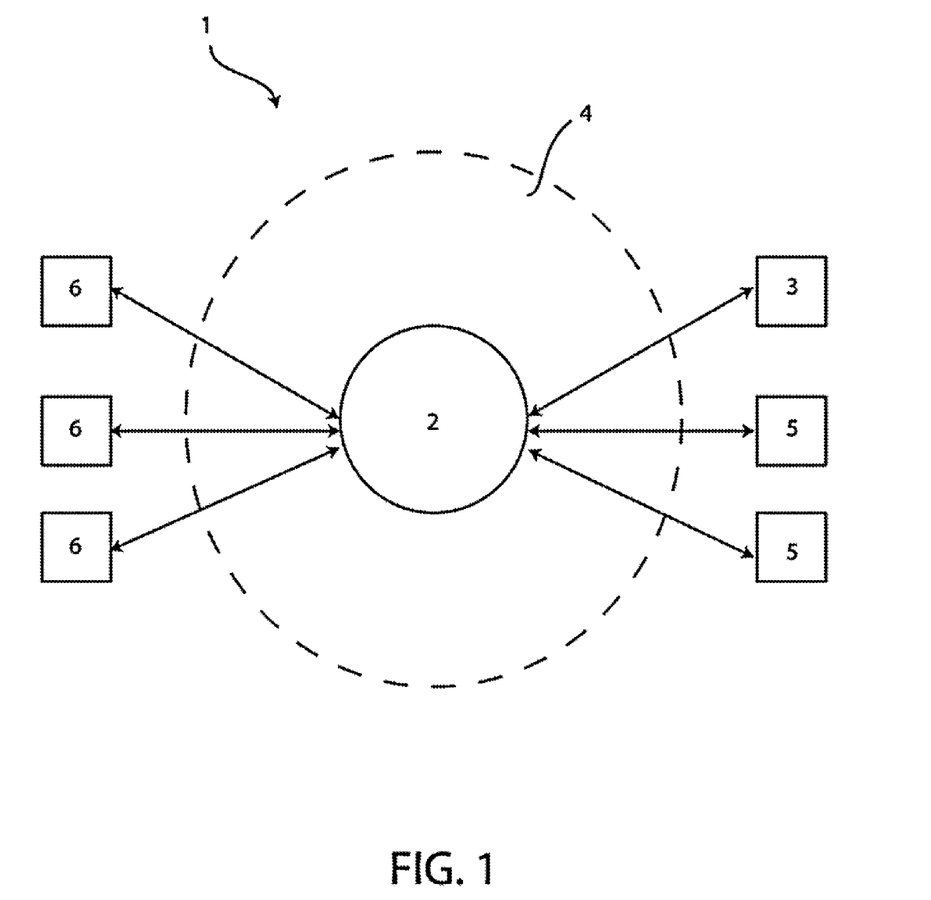
FIG. 1 is a simplified diagram illustrating the basic layout of an embodiment of the present system.

The present invention is a garment sizing system 1 that that identifies the correct garment size for a particular garment type from a plurality of brands. In an embodiment, the garment sizing system 1 comprises software resident on a distributed client-server system comprising a host server 2 and one or more client workstations 5. The server system may be a PC-based networked client/server system comprising at least one server 2 maintained by a manager or ASP 3 to host client-accessible garment sizing software accessed via a website URL, plus at least one garment sizing database. Alternatively, the software may be resident locally on client terminals, in which case the garment sizing database may likewise be resident on server 2 maintained by a manager or ASP 3 or may likewise be resident on the client terminal. A specific example of the latter would be a garment sizing system 1 including garment sizing software developed to operate with the Apple® iPhone® OS. The software is resident locally on the iPhone® and either makes calls to a remote garment sizing database resident on the same iPhone® and preferably updated periodically inasmuch as garment sizing changes frequently.

FIG. 1 is a simplified diagram illustrating a suitable client-server hardware and software architecture according to one embodiment of the present system 1. A website is accessed by the client or consumer over a communication network 4 such as the internet, local area networks (LANs), and wide area networks (WANs). The server 2 may run on a web-enabled Microsoft platform, such as Windows 2000 Advanced Server edition and MS SQL Server 2000, though these are exemplary components only and other web-enabled platform will suffice. The database may be a SQL database or any other suitable database.

The method of the present invention begins with acquiring and consolidating garment size data from a plurality of manufacturers and retailers. The garment size data includes categorical garment type, brand name, brand line (if there are multiple lines of a specific garment type for a particular brand), retailers that sell that sell the brand, garment store size, and dimensional garment measurements. The categorical garment size data may be solicited directly from the plurality of manufacturers and retailers by a web interface using a networked computer workstation 5, or may be manually entered by the ASP using a networked computer workstation 3, or may be mined and automatically downloaded from the brand's or retailer's computer design or product system. The dimensional garment measurements corresponding to each store size provide a basis for correlating the "true size" or actual size of a desired garment from consumer-input size and/or garment information despite the variability of listed store sizes.

The database is populated with the garment data including the following categories or any subset thereof: garment type, brand name, brand line (if there are multiple lines of a specific garment type for a particular brand), retailers that sell that sell the brand, garment size, and dimensional garment measurements. Garment types include, for example, the following designations or subset thereof: dress, outwear, top, jeans, pants, and skirt.

Brand names would include any name or designation that identifies the manufacturer of the garment, for example, ABERCROMBIE & FITCH, ANTHROPOLOGIE, COLE HAAN, GAP, 7 FOR ALL MANKIND, and RALPH LAUREN. If there are multiple lines for a specific garment type under a particular brand name, the garment data may also include the name of the brand line. For example, GAP offers the brand lines ALWAYS SKINNY, SEXY BOOT, and PERFECT BOOT for jeans. The garment data may also comprise retailers that sell the particular garment, whether through the brand's own retail stores, for example, GAP, JCREW, and ABERCROMBIE & FITCH stores, or independent retailers such as NORDSTROM'S, LORD & TAYLOR, and MACY'S.

Dimensional garment measurements may comprise, for example, the following measurements or subset thereof: shoulder circumference, bust circumference, waist circumference, hip circumferences, thigh circumferences, arm circumference, waist length, inseam, and arm length. The particular dimensional measurement used can vary by garment type and brand. For example, thigh circumference is irrelevant to coat sizing and thus would be omitted in the garment data set. The dimensional measurements may be determined by measuring the pattern guide, importing values from the brand's computer design or cutting system, or by manually measuring the garment. Garment data can be inputted into the database by the brand manufacturer or retailer using a networked computer workstation 5, by the ASP using a networked computer workstation 3, or by automatically downloading the data from the brand's or retailer's computer design or product system.

Consumers access the software of the present system through a website URL from a networked device 6 such as personal computer or a smart phone. For example, consumers could access the garment sizing system 1 using personal computers while shopping online or using mobile devices when shopping in the stores. Using the website software, consumers can input their body measurements or the garment size of a particular garment known to fit to determine the correct garment size for a garment type from a plurality of brands. This inputted data is also stored in the database. Consumer body measurements may comprise, for example, the following measurements or subset thereof: shoulder circumference, bust circumference, waist circumference, hip circumferences, thigh circumferences, arm circumference, waist length, inseam, and arm length. Preferably, the body measurements include at least bust circumferences, waist circumference, and hip circumference and correspond to the dimensional garment measurements inputted into the database.

In the web-enabled client/server embodiment, the consumer accesses the home URL, such as www.sizewize.com, using a browser from a networked computer or using a browser or mobile phone application on a networked mobile device. This URL engenders a home page that contains introductory information on the garment sizing system advocating the use of the website to quickly identify the correct garment size for a particular garment type from a plurality of brands.

Figure 2:
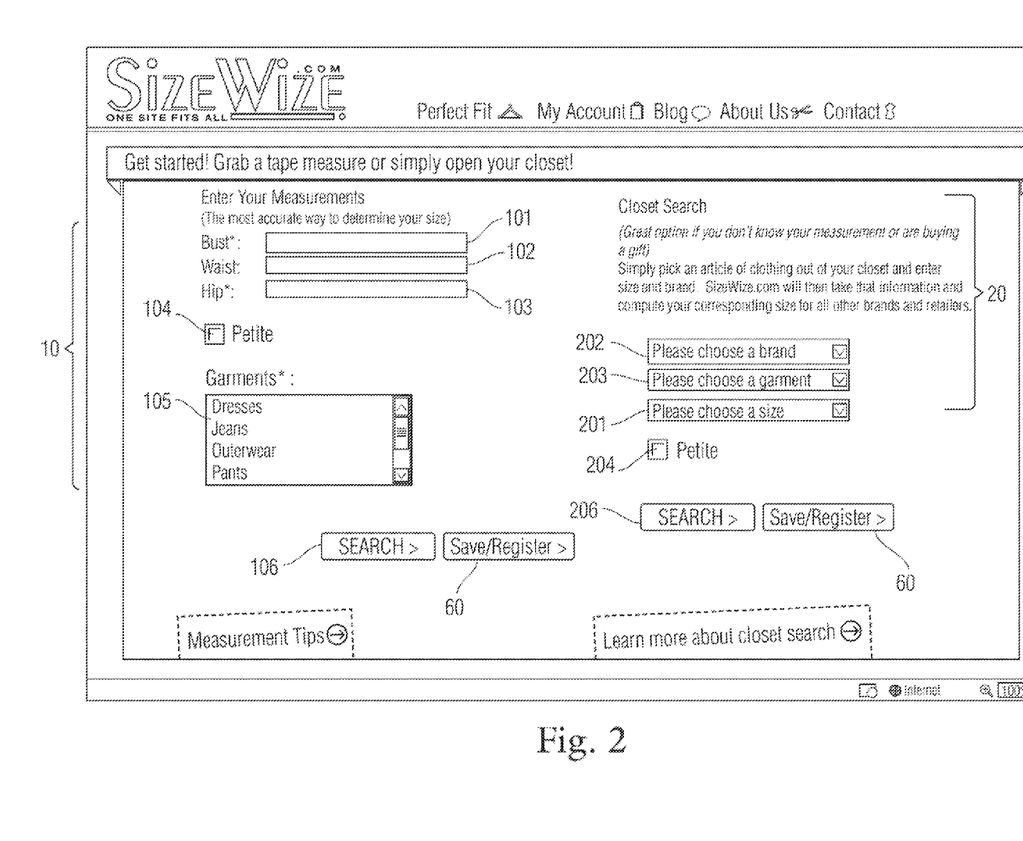
FIG. 2 is a screen print of an embodiment of the home page.
Figure 3:
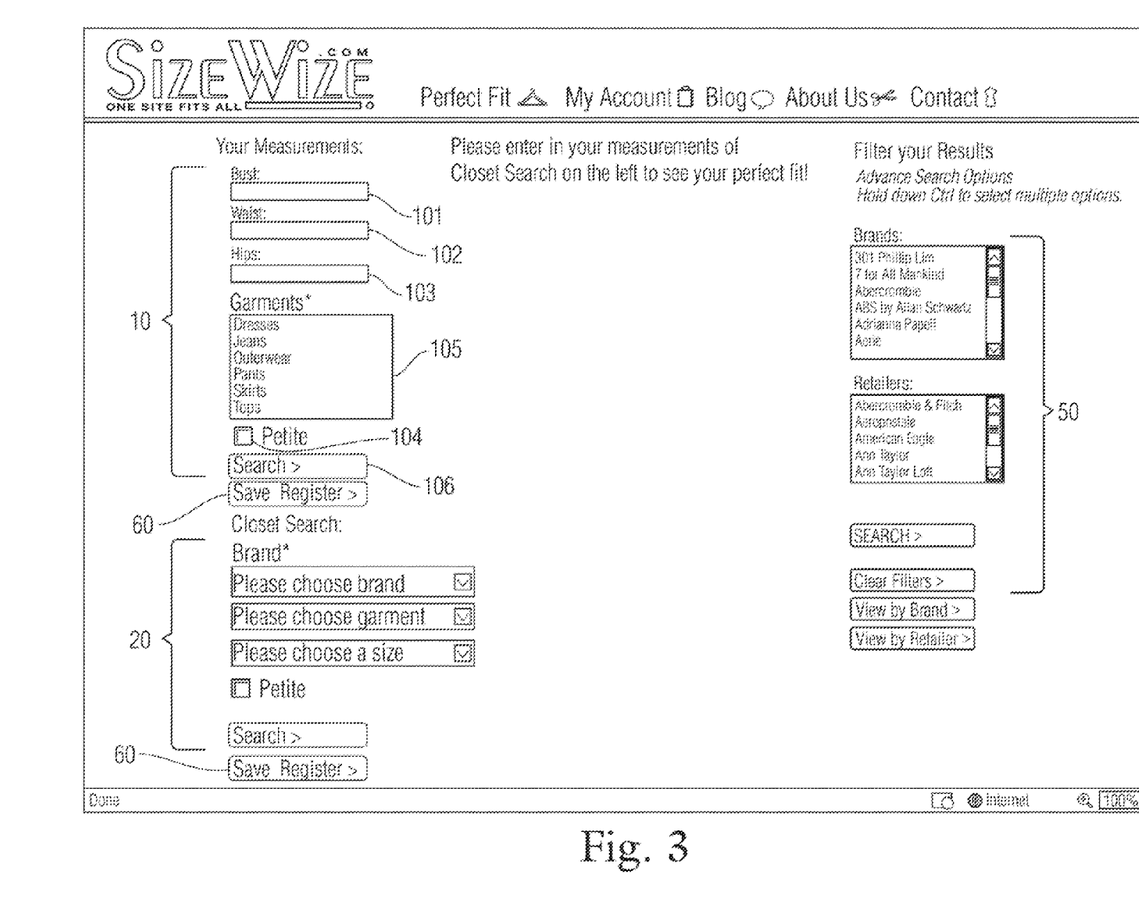
FIG. 3 is a screen print of another embodiment of the home page.
Figure 4:
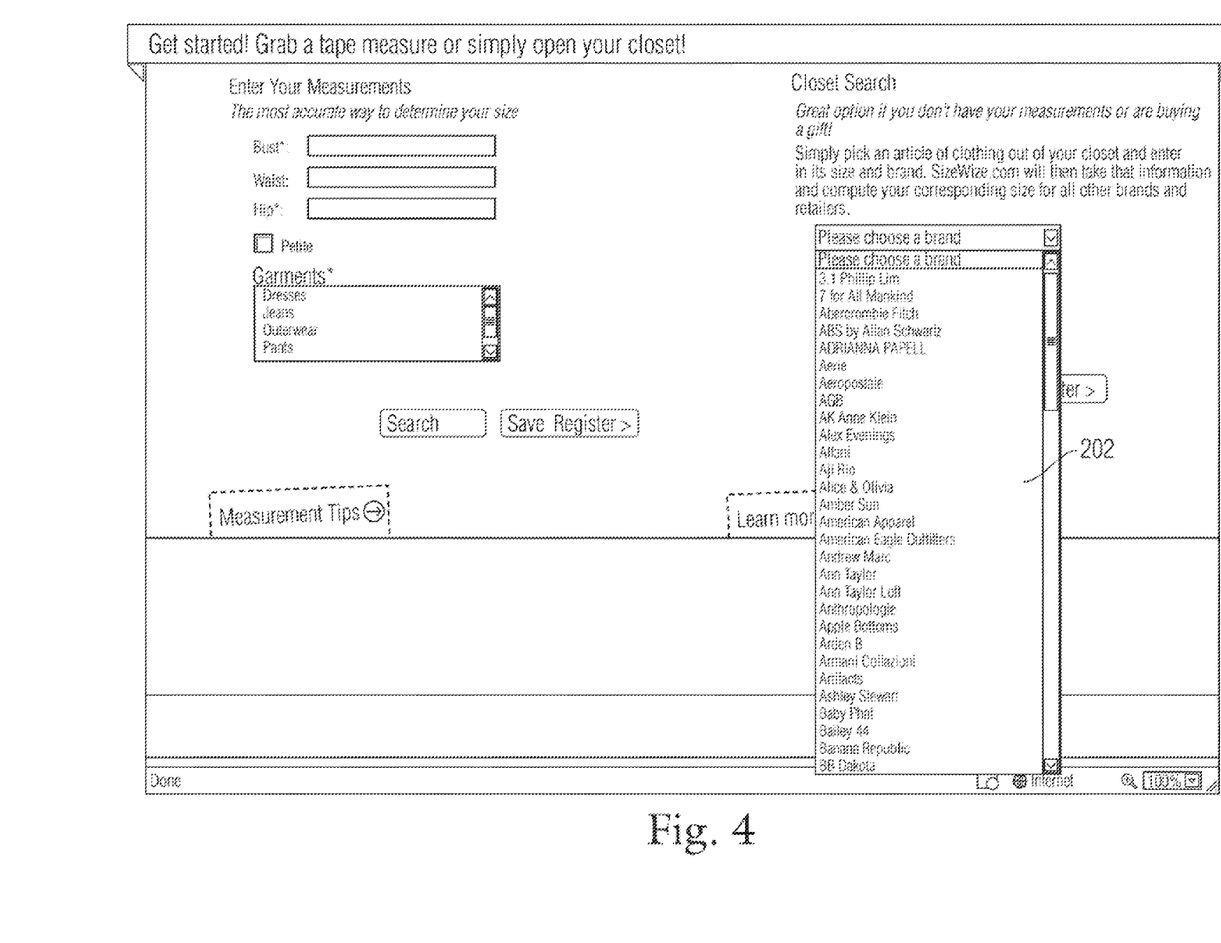
FIG. 4 is a screen print of the home page illustrating the scroll-down menu for brand selection in the known article of clothing input form.
Figure 5:
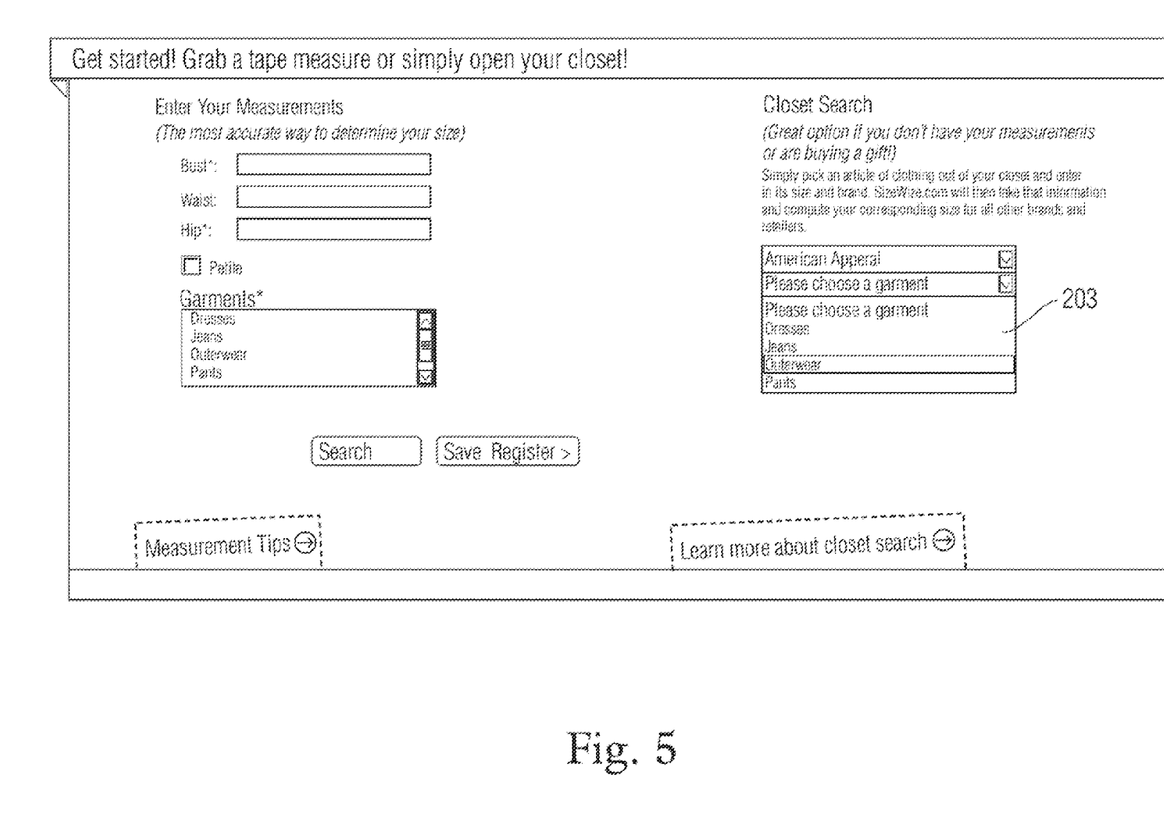
FIG. 5 is a screen print of the home page illustrating the scroll-down menu for garment type selection in the known article of clothing input form.
Figure 6:
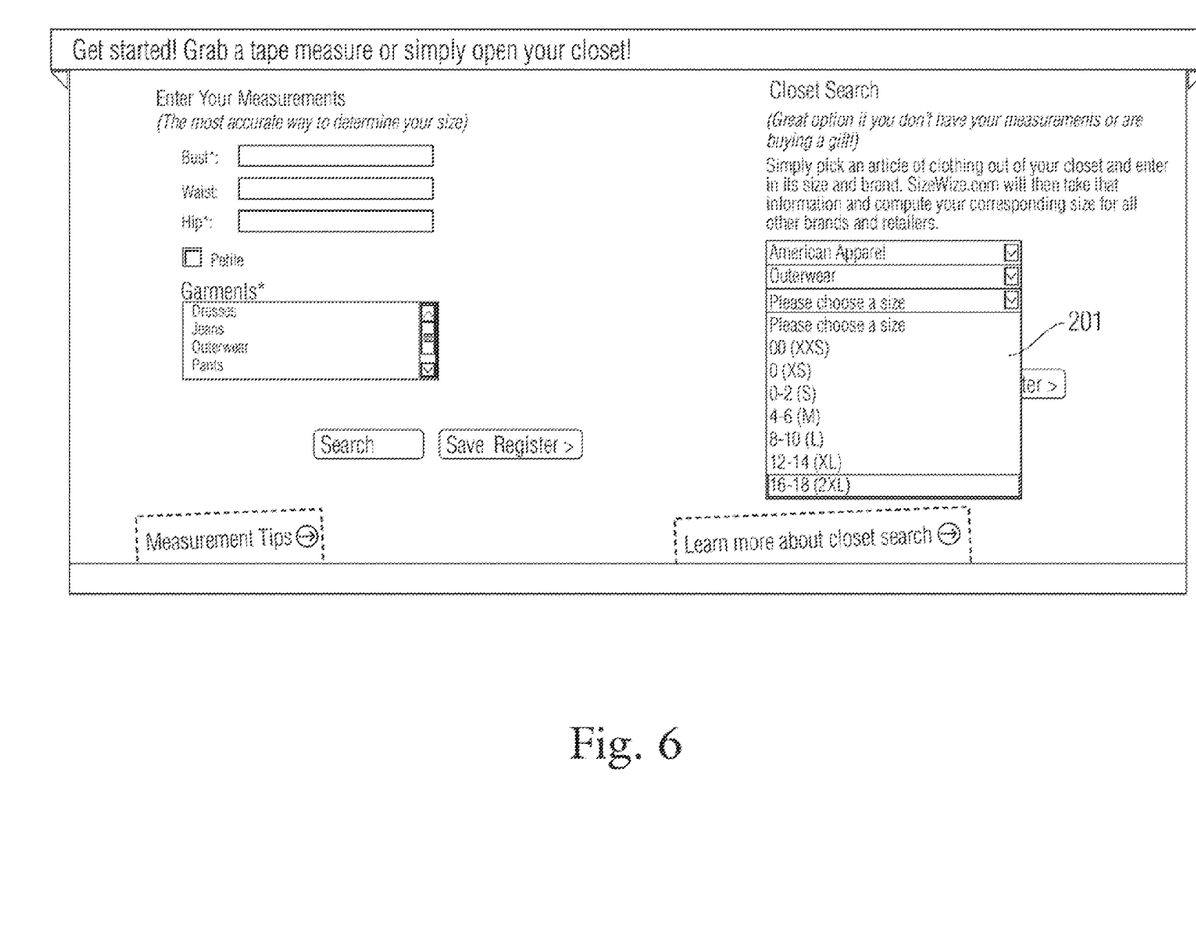
FIG. 6 is a screen print of the home page illustrating the scroll-down menu for size selection in the known article of clothing input form.

FIG. 2 is a screen print of an embodiment of the home page that has a body measurement input form 10 that prompts the consumer to enter the consumer's body measurements, an indication of whether the consumer is petite 104, and the desired garment type 105, and a known article of clothing input form 20 for designating the size, brand, and type of garment whose size is known to fit. FIG. 3 is a screen print of an alternate embodiment of the home page. Preferably, the form 10 prompts the consumers to enter at least their bust circumference 101, waist circumference 102, and hip circumference 103. The body measurement input form 10 may utilize simple direct data input boxes or scroll-down menus populated with a list of options for each respective category. The known article of clothing input form 20, the "Closet Search," prompts a user to enter the size 203, brand 202, and garment type 203 of a particular garment that is known to fit the consumer, as well as an indication of whether the consumer is petite 204. The input form 20 may utilize simple direct data input boxes or scroll-down menus as illustrated in FIGS. 4-6.

After the consumer has entered the prompted data using either the body measurement input form 10 or the known article of clothing input form 20, the consumer presses the respective search button 106 or 206 to initiate the sizing identification process to be described. The garment sizing system 1 employs a sizing identification engine that correlates the user-inputted body measurements or garment size of the particular garment known to fit, to the true garment sizes for a given garment type from a plurality of brands. As described in more detail below, it does this by determining the smallest size within each brand for which the dimensional garment measurements are greater than the consumer body measurements or measurements for the garment known to fit. Thus, the sizing identification engine transforms the user-inputted data into a result list 30 which displays the name of the brands for the selected garment type and store sizes all based on the true size that fits the consumer based on the inputted consumer data.

Figure 7:
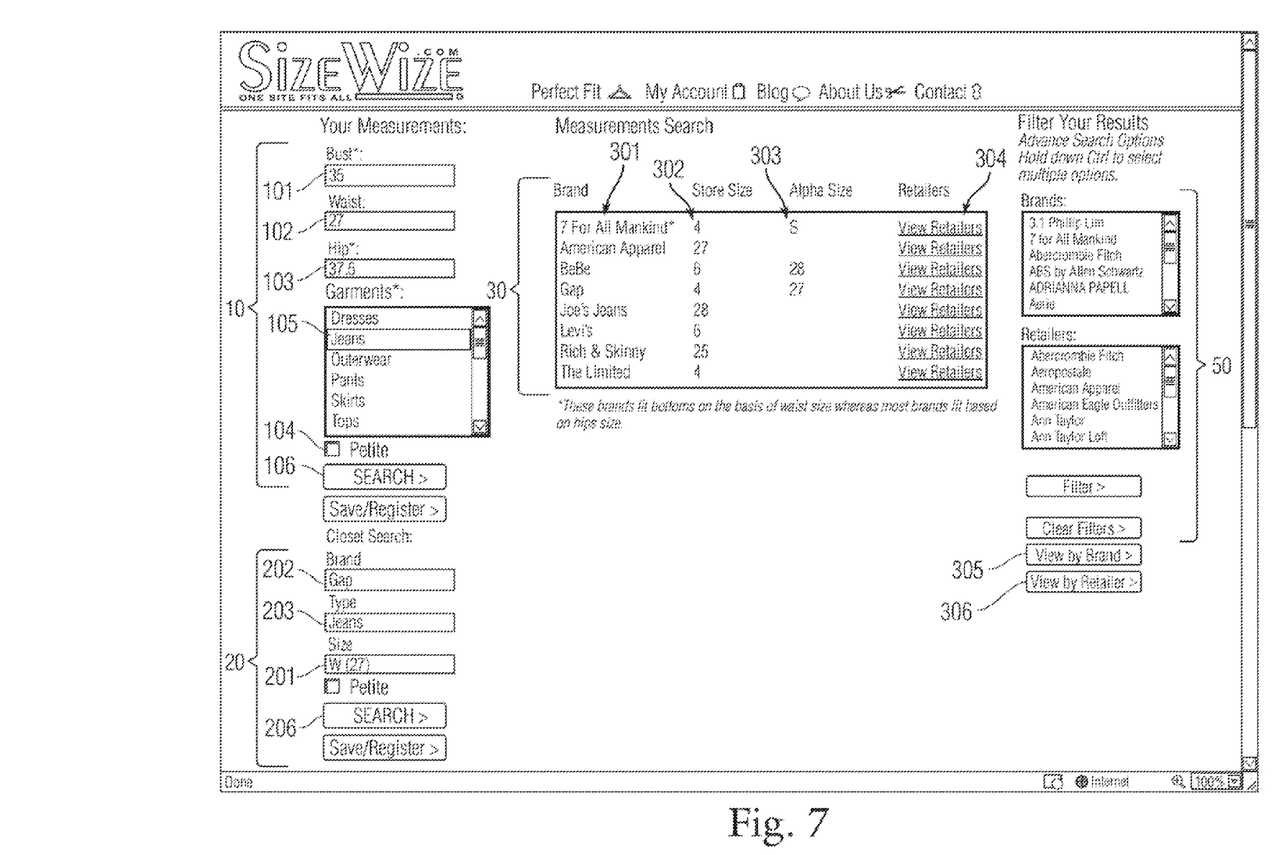
FIG. 7 is a screen print of the result list using the consumer body measurement input form.
Figure 8:
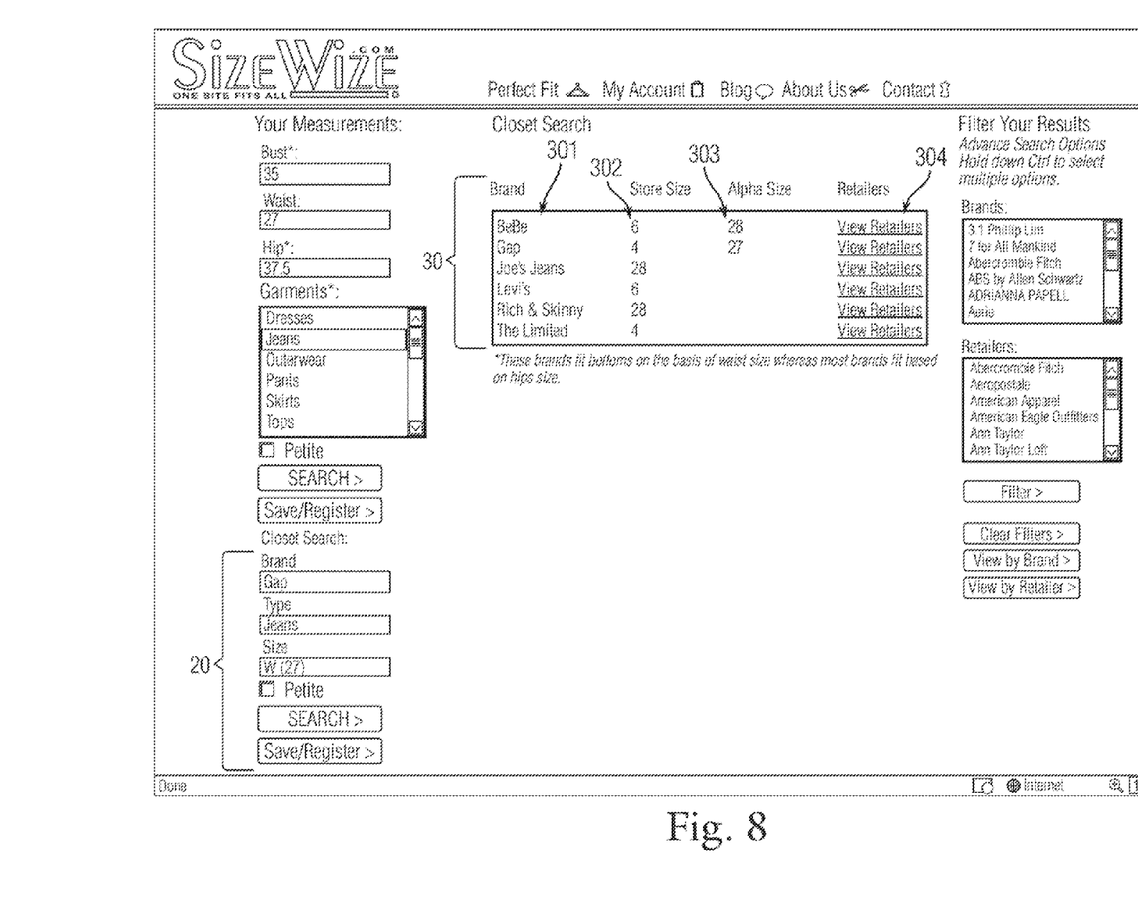
FIG. 8 is a screen print of the result list using the known article of clothing input form.
Figure 9:
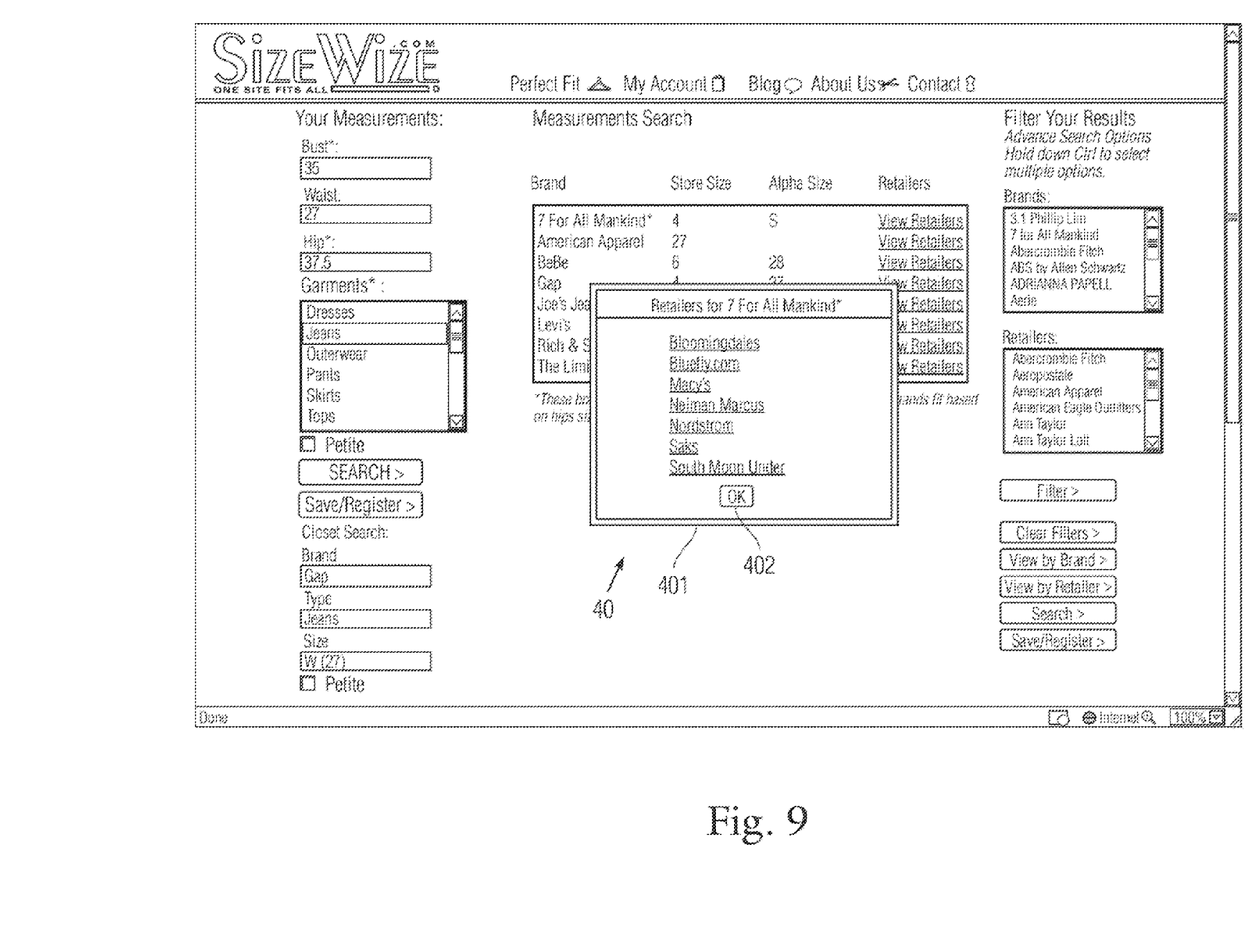
FIG. 9 is a screen print of the retailer pop-up window.

FIG. 7 is a screen print of a displayed result list 30 for a consumer that entered 35", 27", and 37.5" in the body measurement input form 10 for measurements 101, 102, and 103, respectively, and FIG. 8 is a screen print of a displayed result list 30 for a consumer that used the known article of clothing input form 20 for size 4 GAP jeans. The result list 30 displays the name of the brand 301 for the selected garment type 105 that have a store size 302 that fit the consumer based on the inputted consumer data. An alternate sizing label 303 (for example, S, M, L, and XL, or European sizing equivalent) and a retailer list link 304 are also displayed on the result list 30. The consumer can click the retailer list link 304 to show a retailer pop-up window 40 that provide links 401 to the retailers that sell that brand. FIG. 9 is a screen print of a retailer pop-up window 40. By clicking on the links 401, the consumer is directed to that retailer's website to initiate a purchase transaction. Clicking on the OK button 402 closes the pop-up window 40.

To the right of the result list 30 is a filter selection tool 50. The filter selection tool 50 allows the consumer to filter the results by either brand 501 or retailers 502 that sell the garment type. The consumer selects the desired brand or retailer from the respective scroll down menus 501 and 502 (multiple brands or retailers can be selected by holding down the CTRL key while selecting the desired brands or retailers), and clicks the filter button 503 to parse the result list 30, showing only garments from the desired brand or retailer.

Figure 10:
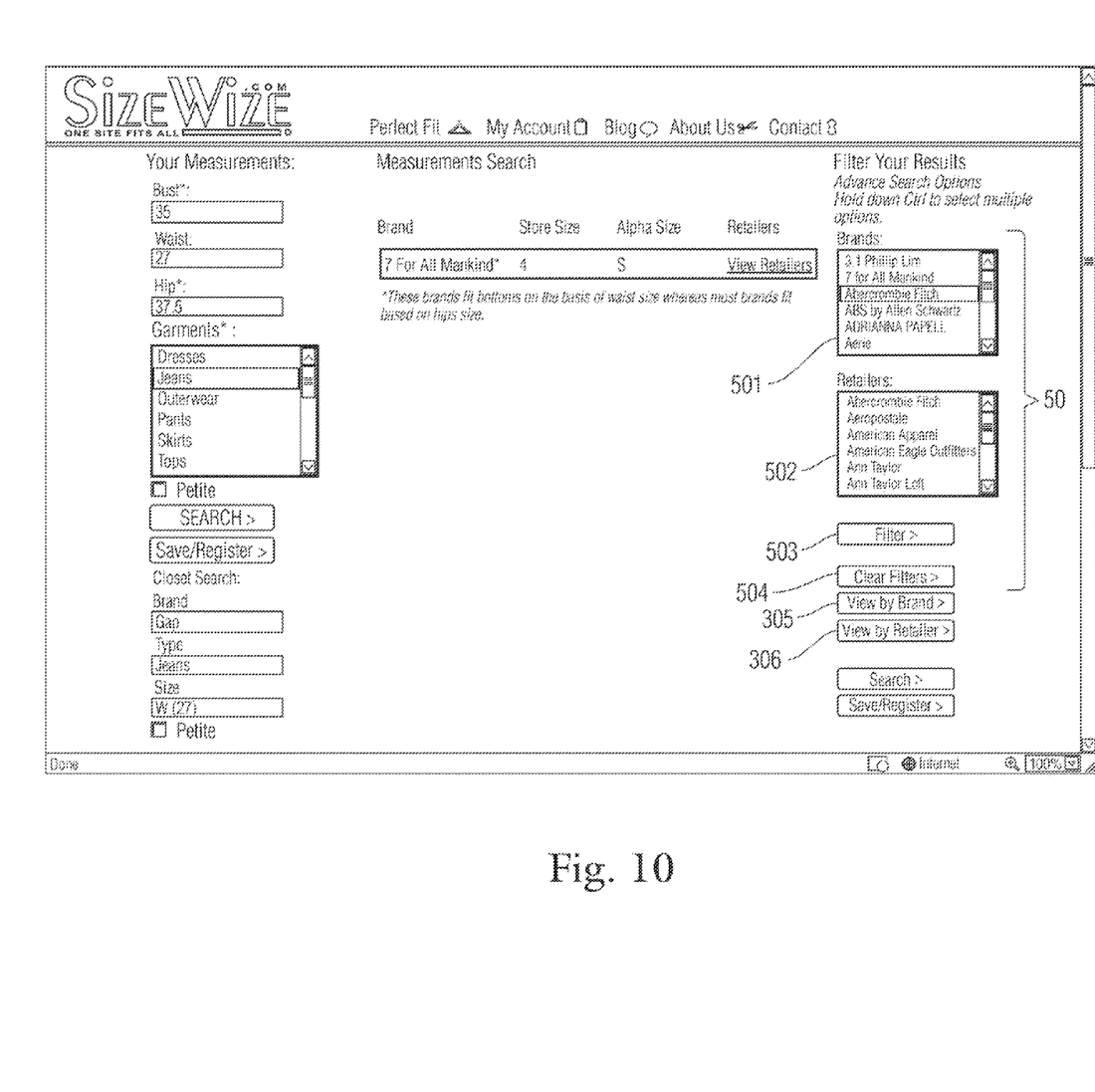
FIG. 10 is a screen print of the result list using a filter.

FIG. 10 is a screen print of the filtered result list 30 of FIG. 7 using a desired brand 501 as the filter parameter. Pressing the Clear Filter button 504 removes the filter parameters from the result list 30 to display an unfiltered result list 30.

Figure 11:
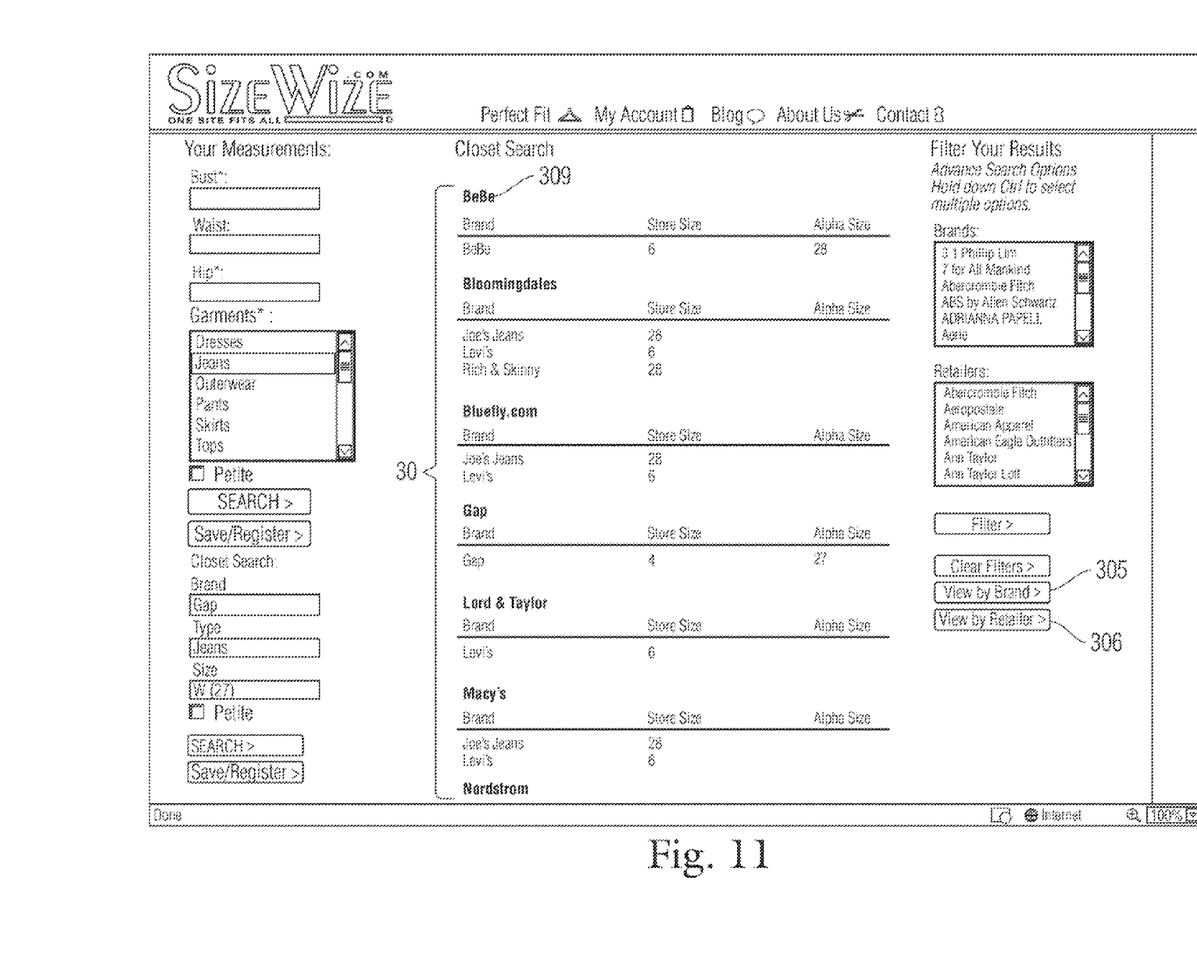
FIG. 11 is a screen print of the result list sorted by retailer.

Referring collectively to FIGS. 7-10, by default, the results are sorted alphabetically by brand name. However, should the consumer choose to view the results alphabetically by retailers that sell the brand, the consumer can click the View By Retailer button 306 to sort the result list 30 accordingly. FIG. 11 is a screen print of the result list 30 sorted by retailer. Thus, the result list 30 now displays the retailer name 309 and all brands that fit the consumer that are sold at that retailer. To revert back to the default result list 30 sorted by brand name, the consumer presses the View by Brand button 305.

After the client has inputted data into the body measurement input form 10 or the known article of clothing input form 20, the client can save this consumer-specific information into the database by pressing the Save/Register button 60 for quick and convenient access the next time the consumer desires to use the system. To use this feature, the consumer must create a user profile with the ASP by providing a user name, password, and bibliographic information. When the user presses the Save/Register button 60, the consumer-specific sizing information is saved in the database and associated with that user profile.

To create the result list 30 using the data inputted in the consumer body measurement input form 10, the sizing software hosted on the server 2 searches the garment data in the database and identifies the garments that have dimensional garment measurements greater than the corresponding inputted body measurements. The software then determines the smallest size within each brand for which the dimensional garment measurements are greater than the consumer body measurements, and displays the results in the result list 30. To create the result list 30 using the known article of clothing input form 20, the software determines the dimensional garment measurements for the garment known to fit by searching the inputted garment data. The software then identifies additional garments that have dimensional garment measurements that are greater then the dimensional garment measurements for the garment known to fit. The software then determines the smallest size within each brand for the additional garments, and displays the results in the result list 30.

It should now be apparent that the foregoing system and computer-implemented method consolidates, processes and transforms particular garment size data on a distributed computer architecture and provides a website point of entry for consumers to identify the correct size of a desired garment type across a plurality of different brands producing that garment type, the correct outputted size of the desired garment type being computed from, alternatively, consumer inputted 1) body measurements, or 2) the size of a specific garment that is known to fit the consumer, with reference to a database of garment sizing information for the variety of different brands that cross-references garment sizes offered by each brand correlated to actual sizes, and ascertains from the database the smallest garment size offered by each brand which corresponding actual size equals or exceeds of the actual size required for the consumer-inputted dimensional garment measurements or specific garment known to fit, display a consumer-oriented results list. This equalizes the brand variation in sizing standards and gives consumer-confidence even when the consumer cannot try on the garment before purchasing.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed:

1. A method of ascertaining garment size of a particular garment type for a consumer, the method comprising:

storing garment data in a database resident on a web-enabled computer server, wherein the garment data is associated with a plurality of garments and for each of the plurality of garments includes a brand name, a retailer that sells the brand name, a store size, and one or more actual dimensional garment measurements which are different from the store size;

receiving, by the web-enabled computer server, a designation by a consumer of a garment known to fit the consumer, wherein the designation includes a selected garment type, a selected brand name, and a selected store size;

receiving, by the web-enabled computer server, a designation by the consumer of a desired garment type for purchase;

determining, from the database, actual dimensional garment measurements for the garment known to fit the consumer using the selected garment type, the selected brand name, and the selected store size;

identifying, by the web-enabled computer server, one or more garments in the database which correspond to the desired garment type and have actual dimensional garment measurements greater than or equal to the actual dimensional garment measurements for the garment known to fit the consumer;

identifying a subset of garments, from the identified one or more garments, which have a smallest store size within each respective brand name; and transmitting for display to the consumer the subset of garments.

2. The method of claim 1, further comprising receiving one or more body measurements from the consumer.

3. The method of claim 1, wherein the one or more body measurements include at least one of a bust size, a waist size, and a hip size.

4. The method of claim 2, further comprising identifying a plurality of brand manufactures or retailers in the database that sell the desired garment type having actual dimensional garment measurements equal to or exceeding the one or more body measurements from the consumer.

5. The method of claim 4, further comprising transmitting for display a list of the plurality of brand manufacturers or retailers in association with brand names corresponding with the desired garment type and a smallest store size for each brand sold by the plurality of brand manufacturers or retailers that equals or exceeds the one or more body measurements from the consumer.

6. A system of ascertaining garment size of a particular garment type for a consumer, the system comprising:
   at least one computer processor;
   at least one memory having instructions which configure the at least one computer processor to:
      store garment data in a database, wherein the garment data is associated with a plurality of garments and for each of the plurality of garments includes a brand name, a retailer that sells the brand name, a store size, and one or more actual dimensional garment measurements which are different from the store size;
      receive a designation by a consumer of a garment known to fit the consumer, wherein the designation includes a selected garment type, a selected brand name, and a selected store size;
      receive a designation by the consumer of a desired garment type for purchase;
      determine, from the database, actual dimensional garment measurements for the garment known to fit the consumer using the selected garment type, the selected brand name, and the selected store size;
      identify one or more garments in the database which correspond to the desired garment type and have actual dimensional garment measurements greater than or equal to the actual dimensional garment measurements for the garment known to fit the consumer;
      identify a subset of garments, from the identified one or more garments, which have a smallest store size within each respective brand name; and
      transmit for display to the consumer the subset of garments.

7. The system of claim 6, further comprising receiving one or more body measurements from the consumer.

8. The system of claim 6, wherein the one or more body measurements include at least one of a bust size, a waist size, and a hip size.

9. The system of claim 7, further comprising identifying a plurality of brand manufactures or retailers in the database that sell the desired garment type having actual dimensional garment measurements equal to or exceeding the one or more body measurements from the consumer.

10. The system of claim 9, further comprising transmitting for display a list of the plurality of brand manufacturers or retailers in association with brand names corresponding with the desired garment type and a smallest store size for each brand sold by the plurality of brand manufacturers or retailers that equals or exceeds the one or more body measurements from the consumer.

11. A non-transitory computer readable medium having executable instructions stored thereon which when executed by at least one computer processor causes the at least one computer processor to:
   store garment data in a database, wherein the garment data is associated with a plurality of garments and for each of the plurality of garments includes a brand name, a retailer that sells the brand name, a store size, and one or more actual dimensional garment measurements which are different from the store size;
   receive a designation by a consumer of a garment known to fit the consumer, wherein the designation includes a selected garment type, a selected brand name, and a selected store size;
   receive a designation by the consumer of a desired garment type for purchase;
   determine, from the database, actual dimensional garment measurements for the garment known to fit the consumer using the selected garment type, the selected brand name, and the selected store size;
   identify one or more garments in the database which correspond to the desired garment type and have actual dimensional garment measurements greater than or equal to the actual dimensional garment measurements for the garment known to fit the consumer;
   identify a subset of garments, from the identified one or more garments, which have a smallest store size within each respective brand name; and
   transmit for display to the consumer the subset of garments.

12. The non-transitory computer readable medium of claim 11, further comprising receiving one or more body measurements from the consumer.

13. The non-transitory computer readable medium of claim 11, wherein the one or more body measurements include at least one of a bust size, a waist size, and a hip size.

14. The non-transitory computer readable medium of claim 12, further comprising identifying a plurality of brand manufactures or retailers in the database that sell the desired garment type having actual dimensional garment measurements equal to or exceeding the one or more body measurements from the consumer.

15. The non-transitory computer readable medium of claim 14, further comprising transmitting for display a list of the plurality of brand manufacturers or retailers in association with brand names corresponding with the desired garment type and a smallest store size for each brand sold by the plurality of brand manufacturers or retailers that equals or exceeds the one or more body measurements from the consumer.

* * * * *